United States Patent [19]

Johnson

[11] 4,245,400
[45] Jan. 20, 1981

[54] THREE DIMENSIONAL EDUCATIONAL TOY MODEL SUBDIVISION

[76] Inventor: Burton R. Johnson, 1431 McKinnley, Escondido, Calif. 92027

[21] Appl. No.: 952,152

[22] Filed: Oct. 17, 1978

Related U.S. Application Data

[63] Continuation-in-part of Ser. No. 409,784, Oct. 26, 1973, abandoned.

[51] Int. Cl.³ .................................................. G09B 19/00
[52] U.S. Cl. ........................................ 434/93; 47/33;
46/1 R; 404/1; 434/151; 434/365
[58] Field of Search ................... 35/7 R, 7 A, 40, 41,
35/16; 46/1 R, 12, 16, 17, 202; 47/33, 66, 67,
69; 119/5; 405/270; 428/13; 273/32 RH, 258

[56] References Cited

U.S. PATENT DOCUMENTS

| 646,582 | 4/1900 | Murche | 35/41 |
|---|---|---|---|
| 1,393,163 | 10/1921 | Rasely | 35/40 |
| 1,462,179 | 7/1923 | Pfeifer et al. | 46/202 X |
| 1,924,721 | 8/1933 | Leubuscher | 405/270 |
| 2,061,631 | 11/1936 | Law | 47/30 |
| 2,751,880 | 6/1956 | Markowski | 119/5 |
| 3,025,626 | 3/1962 | Schumacher | 35/41 X |
| 3,414,194 | 12/1968 | Seitzinger et al. | 46/17 X |
| 3,458,198 | 7/1969 | DeLucia et al. | 273/258 X |
| 3,685,168 | 8/1972 | Reitz | 273/32 H X |

FOREIGN PATENT DOCUMENTS

| 478500 | 6/1929 | Fed. Rep. of Germany | 47/33 |
|---|---|---|---|
| 1000377 | 10/1951 | France | 47/66 |
| 311102 | 1/1956 | Switzerland | 47/33 |

Primary Examiner—William H. Grieb
Attorney, Agent, or Firm—Lyon & Lyon

[57] ABSTRACT

A three dimensional toy having a base member showing a housing development with structural profile members mounted thereon which are secured by profile locking elements for constructing elevations of roadways, lots and surrounding terrain. The profile members and locking elements also serve as retaining walls for soil which, when shaped to conform to the contours of the profile members and locking elements and provided with living plants defines the topography of a living housing development.

10 Claims, 5 Drawing Figures

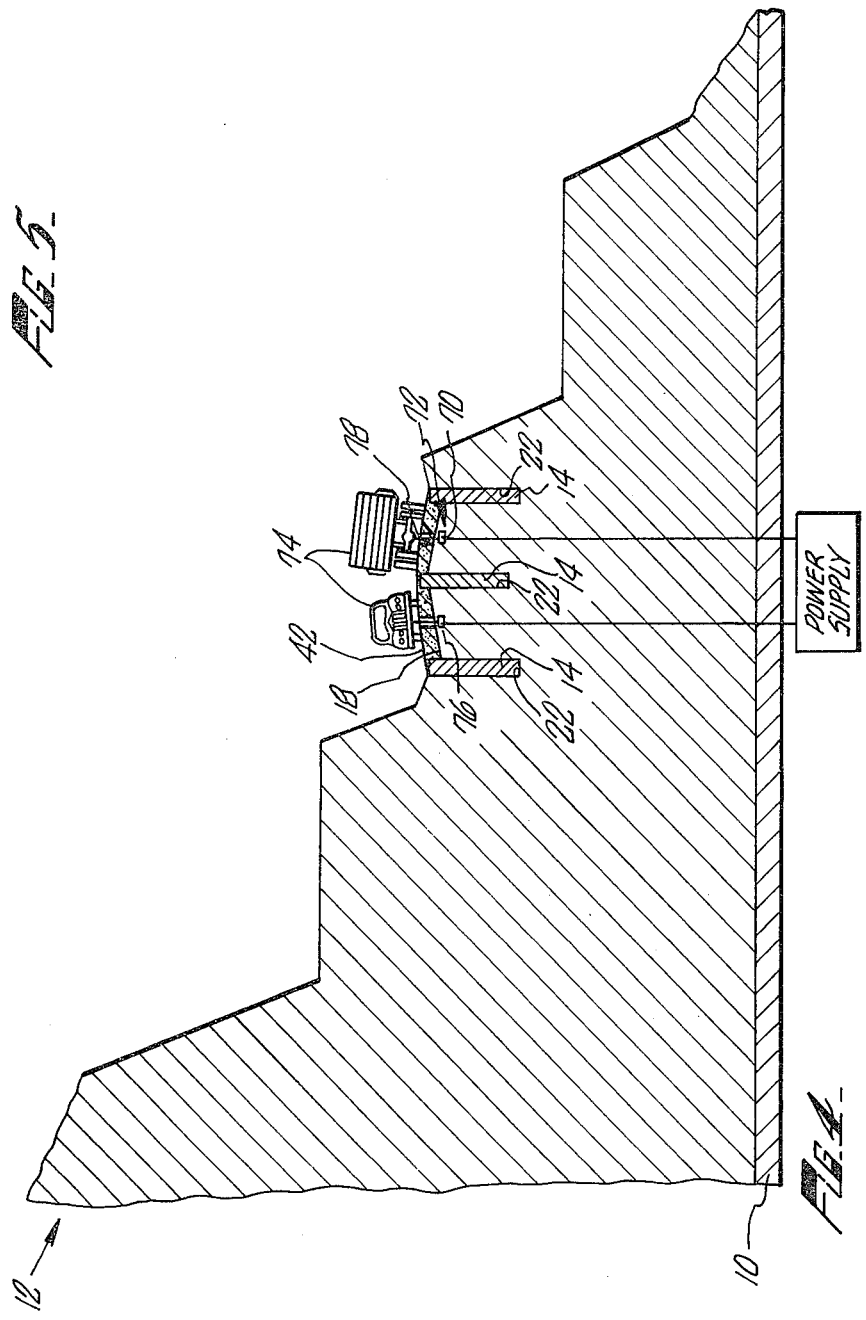

THREE DIMENSIONAL EDUCATIONAL TOY MODEL SUBDIVISION

This application is a continuation-in-part of application Ser. No. 409,784, filed by Burton R. Johnson on Oct. 26, 1973 now abandoned for toy-model living golf course subdivision.

BACKGROUND OF THE INVENTION

The present invention relates to an educational toy, and more particularly, to a three dimensional model for simulating housing developments. Models simulating cities and housing developments are well-known and have been used for many years both as toys and for various display purposes. Unlike mechanical models of cars, engines and the like which often employ movable parts and function as an educational toy, such land development models have little educational value due to their lack of the necessary realism to provide instruction in actual community development. To the contrary, such models generally comprise nothing more than a fixed landscape and terrain with housing models having pre-determined mounting positions and as such, provide no education in the actual design and layout of the community portrayed. An example of such a model is found in U.S. Pat. No. 1,393,163 issued to Rasely.

In contrast to such models which are really only of display value, applicant has developed a model which, due to its realism of land and community development, is highly educational in teaching one the various problems and considerations involved in designing and laying out a community development.

SUMMARY OF THE INVENTION

Briefly, the present invention comprises a model having a baseboard with a plan view of the community layout thereon and a plurality of structural supports for retaining soil placed therebetween on the baseboard. These structural supports also define the contour of the soil and the topography of the community terrain.

It is therefore the principle object of the present invention to provide an educational toy for simulating the realism of community development.

This and other objects and advantages of the present invention will become apparent from the following detailed description taken in conjunction with the accompanying drawings.

In the drawings FIG. 1 is a top plan view of a typical development made in accordance with the present invention.

FIG. 4 is a sectional view taken along line 4—4 of FIG. 1 illustrating two housing lots, a roadway therebetween and a pair of model vehicles thereon moved by an endless chain assembly.

FIG. 5 is a chart listing the design characteristics of one of the curves defined by the roadway.

DESCRIPTION OF THE PREFERRED EMBODIMENT

Figures 1, 2, 3:
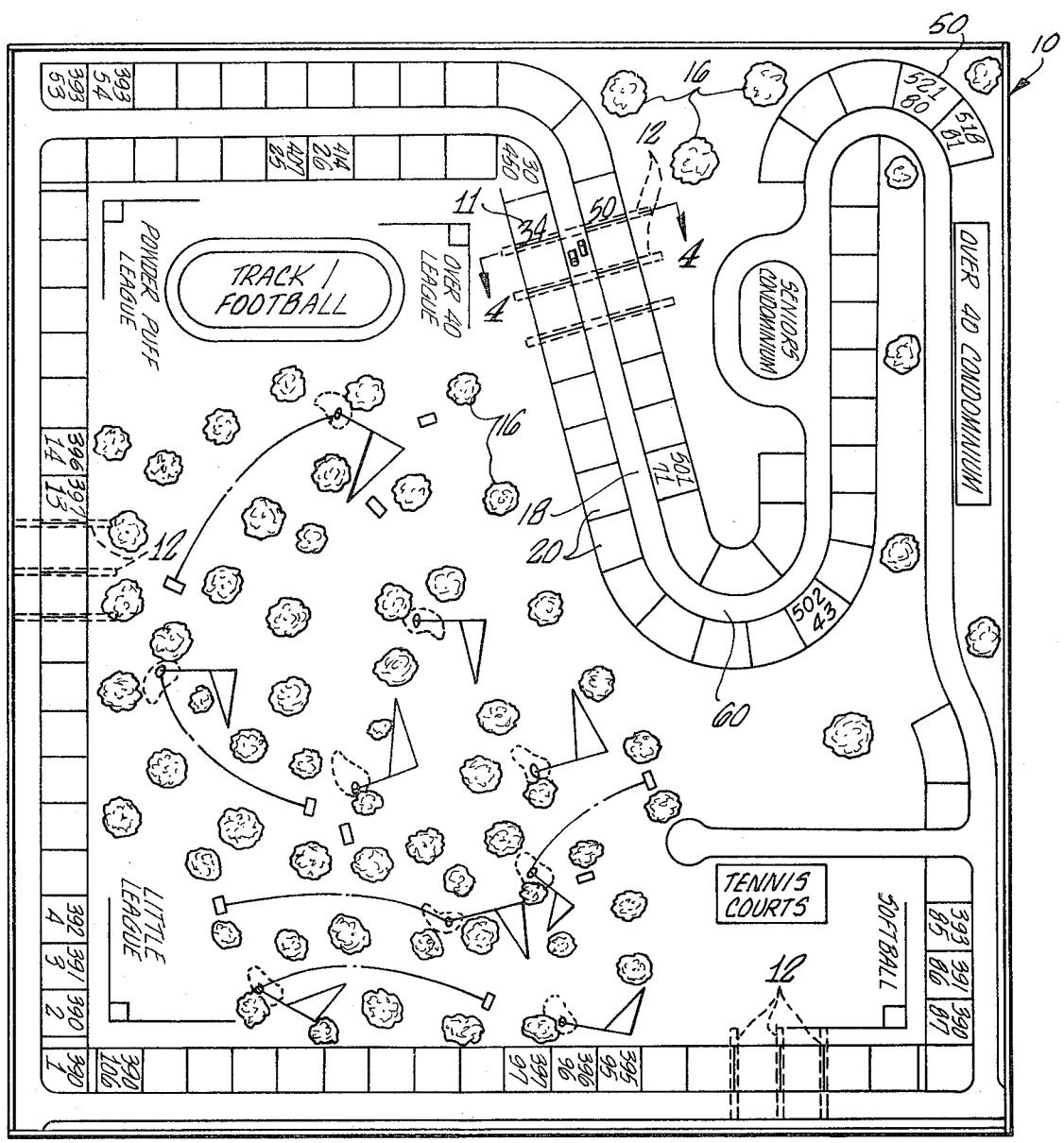
FIG. 2 is a side view of a typical profile retaining member of the present invention.
FIG. 3 is a side view of a profile locking element of the present invention.

Referring now in detail to the drawings, the three dimensional toy of the present invention is comprised of a baseboard 10 a plurality of profile retaining members 12 and a plurality of profile locking elements 14. The baseboard 10 contains thereon a layout of the scale model development on which the remaining components of the construction are placed as well as various indicia 11 providing information as to the construction of the development. In the preferred embodiment of the invention, the baseboard 10 is in the form of a sandbox with the provision of soil to fill in and shape the landscape as dictated by the profile retaining members 12 and elements 14 in the manner to be described. A plurality of live plants 16 may be grown in the soil to further simulate an actual housing development. These may be miniature trees such as Bonsai or the like. While enumerable development designs may be incorporated utilizing the present invention, the development illustrated in the drawings is built around a golf course shown in the center of FIG. 1 with a roadway 18 surrounding the course. A large number of building lots 20 also surround the golf course adjacent the roadway 18. Any number of such lots may be provided on which to place miniature houses and the like (not shown).

In constructing the development, the profile retaining members 12 are vertically mounted on the baseboard 10 at positions indicated on the baseboard. Various means can be employed for mounting the profile retaining members such as slots in the baseboard into which the lower portion of the profile retaining members are fitted. Each of the profile retaining members 12 is provided with at least one slot 22 (three such slots being shown in FIGS. 2 and 4) into which a profile element 14 is placed. The profile element 14 acts to secure together the vertically disposed profile retaining members 12 and together with the profile retaining members defines the profile of the landscape. The area between the profile retaining members is then filled with soil to a level defined by the upper contoured edges 24 of the profile retaining members 12 and the profile elements 14 thereby defining the terrain configuration or topography of the development. For example, the profile element 12 illustrated in FIG. 2 defines a slope 26, a first building pad 28, a second slope 30, roadway 18, a third slope 32, a second building pad 34 below and on the opposite side of roadway 18 from pad 28 and a third slope 36. The profile element 14 illustrated in FIG. 3 slopes upwardly from left to right so that if the end 38 of profile element 14 were inserted into one of the slots 22 in the profile retaining member 12, the terrain over which roadway 18 runs would slope upwardly along the roadway as dictated by the contour of the upper edge of the profile element 14. The profile retaining member (not shown) adjacent that illustrated in FIG. 2, would, of course, be correspondingly taller to receive the other end 40 of the profile element 14 and maintain the curvature of the terrain.

As above described, the roadway 18 is also formed by the combination of the profile retaining members 12, profile elements 14 and soil fill. In the preferred form of the invention, three slots 22 are provided in the profile retaining members 12 along the roadway 18, as seen in FIG. 4. In this manner, the cement or clay 42 from which the surface of the roadway 18 is formed is retained during construction by the three profile elements 14 held within slots 22 in the same manner in which an actual full size roadway is formed and retained during construction. Thus, in addition to supporting the profile retaining members 12 and the soil therebetween, the three profile elements also form a model framework for the road surface.

The remainder of the terrain of the development is formed in the manner described above. By following this building procedure, one learns considerable information regarding the building of actual developments, i.e., grading, road construction, lot planning and positioning, etc. Further, indicia 50 is provided on each lot (such indicia being shown on only a few lots in the drawings) indicating the number of the lot as well as the height or simulated altitude of the lot, thereby providing information to the builder with respect to the relative positioning of the lots which can be effectively employed over a given terrain.

The aforesaid description of the present invention contemplates a kit form wherein the user is provided with each of the aforesaid elements, and through his construction of the development, as described, he is instructed in the actual building and designing process of the land development. While the aforesaid description has been confined to the erection of the profile retaining members and profile elements along the roadway, it is of course, understood that such members and elements can be employed throughout the entire development. Conversely, if desired, the area such as the golf course can be defined solely by the baseboard 10 and merely surrounded by the interconnected profile retaining members and profile elements which, together with the soil fill define the surrounding roadway and building lots which, in the present embodiment, extend about the golf course.

In a second form of the invention, the development is preconstructed. Provisions can be made for altering portions of the terrain by providing additional profile retaining members and profile elements having varying contours to change the terrain and in this manner the same knowledge of construction and terrain design can be imparted to the user. Alternatively, the various elements can be fixed in placed on the baseboard 10. In such a case, it is contemplated that additional building information indicia would be provided on the baseboard 10. For example, at each of the turns in the roadway, see numeral 60, the deflection angle [Δ] of the roadway would be indicated as well as the degree of curve [D], the radius of the curve [R] and, if desired, the tangential distance of the curve [T] (the distance from the beginning of the curve to the point of the intersection of the angle of the curve). Such information is provided by way of example for turn 60 in FIG. 5.

If desired, further realism can be imparted to the development by providing an endless chain 70 or pair of chains under the roadway 18 which are driven by conventional gearing and driving means (generally indicated at 72). Model automobiles 74 are secured by suitable clip means 76 to the chain and moved along the road by the endless chain. Small slots 78 could be provided in the roadway to accommodate clip means 76, or alternatively, magnetic clips might be employed to obviate the need for slots 78. While the addition of these moving models is not needed for applicant's constructional development toy, additional realism and enjoyment could be provided by their use.

As indicated above, the terrain defined by the soil which is held by the profile retaining members and profile elements preferably has small plants and trees planted therein in the same manner in which a large development would be landscaped. Small Bonsai plants are highly suitable for such use and the grass for the golf course and the like can be simulated by plant life, such as Irish Moss and the like.

In another variation of the present invention wherein the kit form is employed, patterns for the profile retaining members and profile elements could be substituted for the members 12 and elements 14. Such a kit would also include the baseboard 10 with the plan view of the development thereon. These patterns could be constructed of lined paper and the user of the kit could construct the various profile retaining members and profile elements from the patterns. This form of it would be less expensive to produce and thereby may prove to be a more attractive educational toy to many individuals.

In yet another embodiment of the educational toy model subdivision, the entire subdivision including its topography, is formed by a molding or stamping process. The toy can be molded from either metal, plastic, fiberglass or other suitable material, or formed from a metal stamping. The toy would include the printed indicia discussed above with respect to the preferred embodiment of the invention, i.e., lot numbers, altitude, center line stationing for the roadway, and the same type of information for the roadway turns as that set forth in FIG. 5. In this embodiment soil can be used with the molded or stamped development if desired. This form of subdivision is well suited as an instructional toy for teaching children some of the basics of construction development.

Various changes in modifications may be made in carrying out the present invention without departing from the spirit and scope thereof. Insofar as these changes in modifications were within the purview of the appended claims, they are to be considered as part of the present invention.

I claim:

1. A three dimensional educational toy for use with soil in constructing the topography of a land development, said toy comprising a base member having indicia thereon; a plurality of profile retaining members adapted to be vertically mounted on said base member at locations defined by said indicia and retain soil disposed on said base member between said profile retaining members, each of said profile retaining members having a contoured upper edge; and a plurality of profile elements adapted to be secured to and extend between said profile retaining members thereby providing support for said profile retaining members, each of said profile elements having a contoured upper edge such that upon securing said profile elements to said profile retaining members and filling the area between said profile retaining members with soil to a level defined by said contoured upper edges of said profile retaining members and said profile elements, said soil and said edges define the contour of said topography.

2. The combination of claim 1 wherein each of said profile elements is defined by a thin length of flexible material and each of said profile retaining members has at least one slot extending through the upper contour surface thereof for receiving a portion of one of said profile elements thereby securing said profile element to said profile retaining member.

3. The combination of claim 2 wherein the side wall of said length of flexible material defines a soil retaining wall for securing said topography in place.

4. The combination of claim 1 wherein the contoured upper edges of a number of said plurality of profile retaining members define the cross-sectional profile of at least one housing lot and a roadway.

5. The combination of claim 4 wherein said number of profile retaining members have three slots therein extending substantially along the center and sides of said roadway such that upon inserting said profile elements therein, said profile elements define a retaining framework for the covering of said roadway with a surface material.

6. A three dimensional educational toy for use with soil in constructing the topography of a land development, said toy comprising a base member having indicia thereon; a plurality of profile retaining members adapted to be vertically mounted on said base member at locations defined by said indicia and retain soil disposed on said base member between said profile retaining members, each of said members having a contoured upper edge and at least one slot extending through said upper edge, a number of said plurality of said profile retaining members defining the cross-sectional profile of at least one housing lot and a roadway; a plurality of flexible profile elements adapted to be inserted through said slots in said profile retaining members thereby securing said profile elements to said profile retaining members, each of said profile elements having a contoured upper edge such that upon securing said profile element to said profile retaining members and filling the area between said profile retaining members with soil to a level defined by said contoured upper edges of said profile retaining members and said profile edges, said soil and said edges define the contour of said topography.

7. The combination of claim 6 wherein said number of said profile retaining members have three slots therein for receiving said profile elements, said slots extending substantially along the center and sides of said roadway defined by said profile retaining members such that upon inserting said profile elements within said slots, said profile elements define a retaining framework for the covering of said roadway with a surface material.

8. A three dimensional educational toy for use in constructing the topography of a land development, said toy comprising a base member having a plurality of indicia thereon; a plurality of profile retaining members carried by said base member and extending vertically therefrom, each of said members having a contoured upper edge, the contoured upper edges of a number of said members defining the cross-sectional profile of at least one housing lot and a roadway; a plurality of profile elements secured to and extending between said profile retaining members, each of said profile elements having a contoured upper edge, the area between said profile retaining members being filled with soil to a level defined by said contoured upper edges of said profile retaining members and said profile elements such that said soil and said edges define the contour of said topography and a plurality of live trees growing in said soil.

9. The combination of claim 8 wherein said roadway extends about said base portion defining a plurality of turns and said indicia on said base member sets forth the degree of deflection, radius and length of each of said turns defined by said roadway.

10. The combination of claim 9 including an endless chain mounted below said roadway, means for moving said endless chain, a plurality of model vehicles disposed on said roadway and means for securing said vehicles to said chain for movement of said vehicles along said roadway.

* * * * *